US012725090B1

(12) United States Patent
Santiago et al.

(10) Patent No.: US 12,725,090 B1
(45) Date of Patent: Sep. 1, 2026

(54) AUTONOMOUS AI AGENT TRAINING USING TIME-BASED SIMULATION MODELS

(71) Applicant: AMESA, Inc., Walnut Creek, CA (US)

(72) Inventors: Octavio B. Santiago, Teresópolis RJ (BR); Kence Anderson, Martinez, CA (US)

(73) Assignee: AMESA, Inc., Walnut Creek, CA (US)

( * ) Notice: Subject to any disclaimer, the term of this patent is extended or adjusted under 35 U.S.C. 154(b) by 0 days.

(21) Appl. No.: 19/557,333

(22) Filed: Mar. 5, 2026

Related U.S. Application Data

(60) Provisional application No. 63/768,213, filed on Mar. 7, 2025.

(51) Int. Cl.
*G06N 20/00* (2019.01)

(52) U.S. Cl.
CPC .................................... *G06N 20/00* (2019.01)

(58) Field of Classification Search
None
See application file for complete search history.

(56) References Cited

U.S. PATENT DOCUMENTS 11,586,960 B2 * 2/2023 Harris .................... G06N 5/022
12,164,292 B2 * 12/2024 Maitra ............... G05B 23/0254
12,204,543 B2 * 1/2025 Cella ................... G06F 16/2455
12,271,382 B2 * 4/2025 Cella ................... G06F 16/2455
12,314,015 B2 * 5/2025 Maitra ............... G05B 13/0265
12,314,060 B2 * 5/2025 Cella ................ G05B 19/41885
2021/0157312 A1 * 5/2021 Cella ...................... G06Q 30/06
2022/0292434 A1 * 9/2022 Khadivi Heris ............................ G06Q 10/063118
2023/0083724 A1 * 3/2023 Cella .................. G06F 16/2455 705/28
2023/0123322 A1 * 4/2023 Cella ................... G05B 13/048 700/29
2023/0266720 A1 * 8/2023 Maitra .............. G05B 13/0265 700/95
2023/0288882 A1 * 9/2023 Maitra .............. G05B 13/0265

* cited by examiner

*Primary Examiner* — Maikhanh Nguyen
(74) *Attorney, Agent, or Firm* — Morse, Barnes-Brown & Pendleton PC; Sean D. Detweiler, Esq.

(57) ABSTRACT

The disclosed method and system involves training an autonomous AI agent using simulation models that incorporate temporal progression in decision-making. The method begins with ingesting system operation data, which includes receiving historical data in a time series sequence and identifying observation sensor and action variables. The data is checked for simulation readiness, and any time gaps in the sequence are addressed by segmenting the data into batches to exclude these gaps. The segmented data is then mapped to a framework for time-based models that account for temporal progression. These models are trained using the mapped data, and a simulation of the system is generated based on the trained models. The trained time-based models are discretized and shaped to fit a decision-making process, which is then used to train the autonomous AI agent. This approach ensures the agent's decision-making is informed by temporal dynamics within the system.

26 Claims, 13 Drawing Sheets

AUTONOMOUS AI AGENT TRAINING USING TIME-BASED SIMULATION MODELS

CROSS-REFERENCE TO RELATED APPLICATION(S)

This application claims priority to, and the benefit of, U.S. Provisional Application 63/768,213, filed Mar. 7, 2025, for all subject matter common to both applications. The disclosure of said provisional application is hereby incorporated by reference in its entirety.

FIELD OF THE INVENTION

The present invention relates to training autonomous artificial intelligence (AI) agents. In particular, the present invention relates to training autonomous AI agents using simulation models that account for temporal progression in decision-making processes.

BACKGROUND

In artificial intelligence, training autonomous agents often involves using simulation models to mimic real-world environments. Traditional approaches have primarily focused on static models that do not adequately account for the dynamic nature of time in decision-making processes. These models typically rely on historical data without considering the temporal progression, which can lead to suboptimal training outcomes for autonomous AI agents. The lack of temporal consideration often results in models that cannot adapt to changes over time, thereby limiting their effectiveness in real-world applications.

Increasingly, autonomous (AI) agents are used to interface with real-world systems. Notably, real-world systems such as manufacturing, engineering, and logistics occur over time. However, the autonomous (AI) agents being created to interface with such real-world systems are often trained using simulations built upon models that do NOT adequately involve temporal considerations, resulting in agents that cannot accurately predict system behavior over time. By understanding how a system evolves over time, models can make more informed predictions and decisions. However, incorporating temporal considerations into machine learning models poses several challenges, including effectively capturing and representing time-dependent patterns and trends, and correctly shaping the dataset for training. There is a growing need for innovative approaches that can seamlessly integrate temporal data into the decision-making processes of machine learning models, thereby enhancing their predictive capabilities and applicability in time-sensitive scenarios.

SUMMARY

There is a need for autonomous AI agents that can more effectively interact with real-world systems by accounting for the passage of time in decision-making processes. The present invention is directed towards further solutions to address this need, in addition to having other desirable characteristics. Specifically, the present invention provides a system and methodology for training an autonomous AI agent using simulation models that incorporate temporal progression in decision-making, enabling the autonomous AI agent to more effectively interface with a real-world system.

In accordance with embodiments of the present invention, a method for training an autonomous artificial intelligence (AI) agent using simulation models that consider a progression of time in decision-making processes is provided. The method includes: ingesting data for operation of a system, the ingesting including: receiving, via one or more processors, data characterizing a system that includes historical data in a time series sequence collected from sensors monitoring the system; identifying, by the one or more processors, observation sensor variables and action variables from the received data; checking, by the one or more processors, whether the data meets minimum requirements for simulation, including verifying time frequency consistency and sensor data quality; determining, by the one or more processors, whether there are one or more time gaps in the time series sequence that would disrupt temporal continuity of the data; when there are one or more time gaps in the time series sequence, segmenting, by the one or more processors, the received data into temporally continuous batches to preserve temporal relationships while omitting the time gaps in the time series sequence; and mapping, by the one or more processors, the segmented data to a framework for one or more machine learning time-based models that consider a progression of time in the decision-making processes; training, by the one or more processors, the one or more machine learning time-based models using the mapped data to generate trained models that predict future system states based on current and historical states and actions; generating, by the one or more processors, a simulation for the system based on the one or more trained time-based models, wherein the one or more trained time-based models are discretized and shaped to a decision-making process to create a virtual environment that mimics temporal behavior of the system; and training an autonomous AI agent using the simulation, wherein the autonomous AI agent learns to make decisions that account for temporal dynamics of the system.

In accordance with aspects of the present invention, checking whether the data meets minimum requirements for simulation includes: checking for missing data or non-numeric data; checking whether time frequency of time series sequence is consistent and equally spaced; checking whether identified sensor variables and action variables are present in the data; checking whether sensor data is outside of defined constraints; and checking for sensor quality issues.

In accordance with aspects of the present invention, mapping the data to a framework for one or more models that consider a progression of time in decision-making processes includes: establishing a present state of the system (St) and a current action (At) for machine learning models based on the data; establishing one or more historical states (St minus time increment) and one or more historical actions (At minus time increment) for machine learning models based on the data; and establishing a future state (St+1) and Action (At+1) to be determined by a machine learning model.

In accordance with aspects of the present invention, the one or more machine learning models include a Markov decision process (MDP) in a discretized simulation.

In accordance with aspects of the present invention, wherein training one or more machine learning models includes: training a machine learning model for each sensor variable in the received data; and evaluating the trained machine learning model by: testing sequence predictions against original data; checking correlations; checking feature importance; checking interpolation and extrapolation; and performing error propagation analysis to determine a prediction horizon.

In accordance with aspects of the present invention, evaluating the trained machine learning model further includes: performing error propagation analysis over different time horizons to identify an optimal time horizon with the lowest error propagation when comparing simulation predictions to the received data.

In accordance with aspects of the present invention, generating a simulation for the system from the one or more trained models includes: providing a trained model for each sensor value in the system; and providing constraints and initial values for each sensor variable.

In accordance with aspects of the present invention, training an autonomous AI agent using the simulation includes: providing an autonomous AI agent; operating the autonomous AI agent in the simulation; and providing feedback on the operation of the autonomous AI agent in the simulation.

In accordance with aspects of the present invention, wherein the one or more time-based models include at least one of a recurrent neural network (RNN), a XGBoost Regressor, a long short-term memory (LSTM) network, a generalized linear model (GLM), or a gated recurrent unit (GRU) network.

In accordance with aspects of the present invention, mapping the segmented data to the framework includes aligning the segmented training data with a predefined input format for the one or more time-based models.

In accordance with aspects of the present invention, training the autonomous AI agent includes utilizing one or more of reinforcement learning, classical controllers, advanced controllers, or a combination of thereof, using the simulation as an environment.

In accordance with aspects of the present invention, segmenting the received data into temporally continuous batches improves accuracy of the trained time-based models by preventing the models from learning incorrect temporal relationships caused by discontinuities in the time series sequence.

In accordance with aspects of the present invention, mapping the segmented training data to the framework includes structuring the segmented data such that each data point includes present states, present actions, historical states, and historical actions across multiple time increments, thereby preserving temporal dependencies between states and actions for the trained models.

In accordance with aspects of the present invention, the trained autonomous AI agent interfaces with a real-world system to control hardware or software based on decisions informed by the temporal dynamics learned from the simulation.

In accordance with aspects of the present invention, the method further includes: deploying the trained autonomous AI agent to control the system in real-time, wherein the autonomous AI agent applies learned temporal relationships to predict system behavior and optimize control actions.

In accordance with aspects of the present invention, the system includes at least one of a manufacturing system, an engineering system, or a logistics system, and wherein the trained autonomous AI agent controls operation of the system based on predictions of future system states derived from the trained time-based models.

In accordance with aspects of the present invention, generating the simulation includes creating a virtual environment that receives action inputs and produces state outputs that reflect how the system evolves over time based on the trained time-based models.

In accordance with aspects of the present invention, the one or more time-based models include at least one of a recurrent neural network (RNN), an XGBoost Regressor, a long short-term memory (LSTM) network, a generalized linear model (GLM), or a gated recurrent unit (GRU) network.

In accordance with aspects of the present invention, mapping the segmented data to the framework includes aligning the segmented training data with a predefined input format for the one or more time-based models.

In accordance with aspects of the present invention, training the autonomous AI agent includes utilizing one or more of reinforcement learning, proportional-integral-derivative (PID) controllers, model predictive control (MPC) controllers, or a combination thereof, using the simulation as an environment.

In accordance with embodiments of the present invention, a system for training an autonomous AI agent using models that consider a progression of time in decision-making processes is provided. The system includes: a data quality check module configured to: receive data characterizing a system that includes historical data in a time series sequence from sensors monitoring the system; identify observation sensor variables and action variables; check whether the data meets minimum requirements for simulation; determine whether there are one or more time gaps in the time series sequence; when there are one or more time gaps in the time series sequence, segment the data into temporally continuous batches to preserve temporal relationships while omitting the one or more time gaps in the time series sequence; and map the data to a framework for one or more time-based models that consider a progression of time in decision-making processes; a machine learning model training module configured to: train a machine learning model for each sensor variable in the data to predict future values based on current and historical states and actions; and evaluate the trained machine learning model; a simulation generation module configured to: provide a trained model for each sensor value in the system; and provide constraints and initial values for each trained model to generate a simulation that mimics temporal behavior of the system; and an agent training module configured to train the autonomous AI agent using the simulation to learn decisions that account for temporal dynamics of the system.

In accordance with aspects of the present invention, checking whether the data meets minimum requirements for simulation includes: checking for missing data or non-numeric data; checking whether time frequency of time series sequence is consistent and equally spaced; checking whether identified observation sensor variables and action variables are present in the data; checking whether sensor data is outside of defined constraints; and checking for sensor quality issues.

In accordance with aspects of the present invention, the agent training module is further configured to: operate the autonomous AI agent in the simulation; and provide feedback on operation of the autonomous AI agent in the simulation.

In accordance with aspects of the present invention, the simulation generation module is further configured to provide physical constraints for each sensor and action variable in the data, defining boundaries within which the simulation operates.

In accordance with embodiments of the present invention, a non-transitory computer-readable medium storing instructions is provided. When executed by one or more processors, the instructions cause the one or more processors to perform operations including: receiving data characterizing a system that includes historical data in a time series sequence collected from sensors monitoring the system; identifying observation sensor variables and action variables from the received data; checking whether the data meets minimum requirements for simulation; determining whether there are one or more time gaps in the time series sequence; when there are one or more time gaps in the time series sequence, segmenting the received data into temporally continuous batches to preserve temporal relationships while omitting the time gaps in the time series sequence; mapping the segmented data to a framework for one or more machine learning time-based models that consider a progression of time in decision-making processes; training the one or more machine learning time-based models using the mapped data to generate trained models that predict future system states based on current and historical states and actions; generating a simulation for the system based on the one or more trained time-based models to create a virtual environment that mimics temporal behavior of the system; and training an autonomous AI agent using the simulation, wherein the autonomous AI agent learns to make decisions that account for temporal dynamics of the system.

In accordance with aspects of the present invention, the operations further include: training a machine learning model for each sensor variable in the received data; and evaluating each trained machine learning model by testing sequence predictions against original data and checking correlations between sensor variables and actions.

In accordance with aspects of the present invention, the operations further include: deploying the trained autonomous AI agent to interface with the system in real-time, wherein the autonomous AI agent controls hardware or software of the system based on decisions informed by the temporal dynamics learned from the simulation The disclosed method and system provide several technical improvements over conventional approaches to training autonomous AI agents. By detecting and handling time gaps in the time series sequence through data segmentation, the invention prevents the machine learning models from learning incorrect temporal relationships that would otherwise result from discontinuities in the training data. By mapping the segmented data to a temporal framework that explicitly represents present states, present actions, historical states, and historical actions, the invention enables the machine learning models to capture and preserve temporal dependencies essential for accurate prediction of system behavior over time. These technical improvements result in autonomous AI agents that can more effectively interface with and control real-world systems.

BRIEF DESCRIPTION OF THE FIGURES

These and other characteristics of the present invention will be more fully understood by reference to the following detailed description in conjunction with the attached drawings, in which.

DETAILED DESCRIPTION

Figure 1:
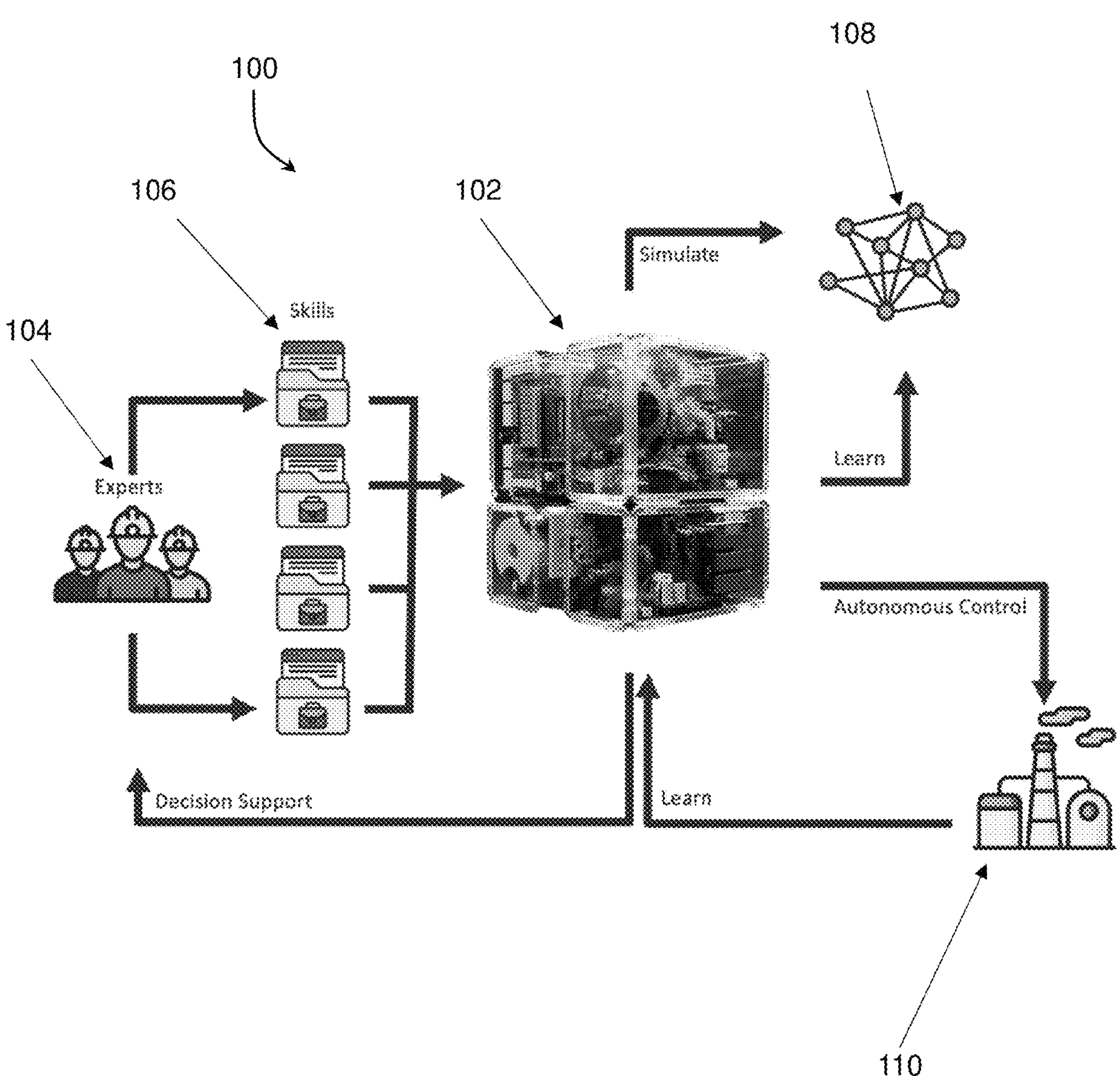
FIG. 1 is a diagrammatic illustration of the environments and inputs involved with the development, training, and deployment of an autonomous agent in accordance with embodiments of the present invention.

The disclosed method and system involve training an autonomous AI agent using simulation models that incorporate temporal progression in decision-making. The method begins with ingesting system operation data, which includes receiving historical data in a time series sequence and identifying observation sensor and action variables. The data is checked for simulation readiness, and any time gaps in the sequence are addressed by segmenting the data into batches to exclude these gaps. The segmented data is then mapped to a framework for time-based models that account for temporal progression. These models are trained using the mapped data, and a simulation of the system is generated based on the trained models. The trained time-based models are discretized and shaped to fit a decision-making process, which is then used to train the autonomous AI agent. This approach ensures the agent's decision-making is informed by temporal dynamics within the system.

FIG. 1 through FIG. 13, wherein like parts are designated by like reference numerals throughout, illustrate an example embodiment or embodiments of systems and methods for designing machine learning models that consider the progression of time in decision-making processes, according to the present invention. Although the present invention will be described with reference to the example embodiment or embodiments illustrated in the figures, it should be understood that many alternative forms can embody the present invention. One of skill in the art will additionally appreciate different ways to alter the parameters of the embodiment(s) disclosed in a manner still in keeping with the spirit and scope of the present invention.

FIG. 1 is a diagrammatic illustration showing a conceptual representation 100 of the environments and inputs involved with the development, training, and deployment of an autonomous AI agent 102. To the left of the autonomous AI agent 102 are experts 104 who possess the know-how and expertise of how to perform a task. This know-how and expertise are captured as skills 106 in the creation of the autonomous AI agent 102 for performing the task. The autonomous AI agent 102 can then be provided a computer-implemented training platform (simulation environment) 108 in which skills 106 can be learned, and the autonomous AI agent 102 can be trained to perform the task. Once trained, the autonomous AI agent can be deployed in and interface with a real-world system 110 to control hardware and/or software. The autonomous AI agent 102 learns, adapts, and improves both the autonomous AI agent's performance of the task and the skills used to perform the task. Examples of such real-world systems can include a manufacturing system, an engineering system, or a logistics system.

Figure 2:
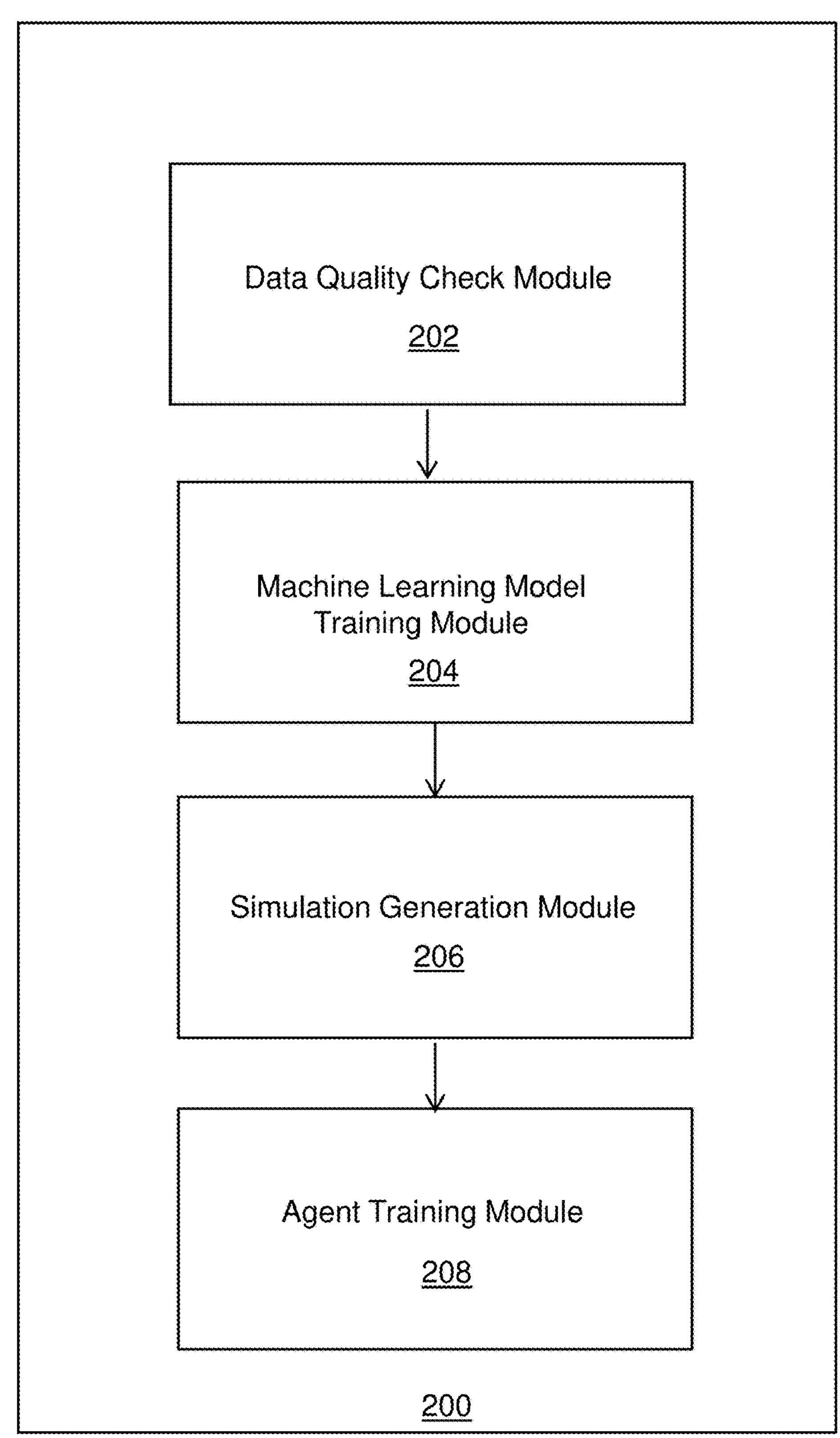
FIG. 2 is a block diagram representation of a system for training an autonomous artificial intelligence (AI) agent using simulation models that consider a progression of time in decision-making processes in accordance with embodiments of the present invention.

FIG. 2 depicts an example system 200 for training an autonomous (AI) agent 102 using models that account for temporal progression in decision-making processes. The system includes a data quality check module 202, a machine learning model training module 204, a simulation generation module 206, and an agent training module 208. The modules 202, 204, 206, and 208 can be implemented using hardware, software, or a combination of both.

Figure 3:
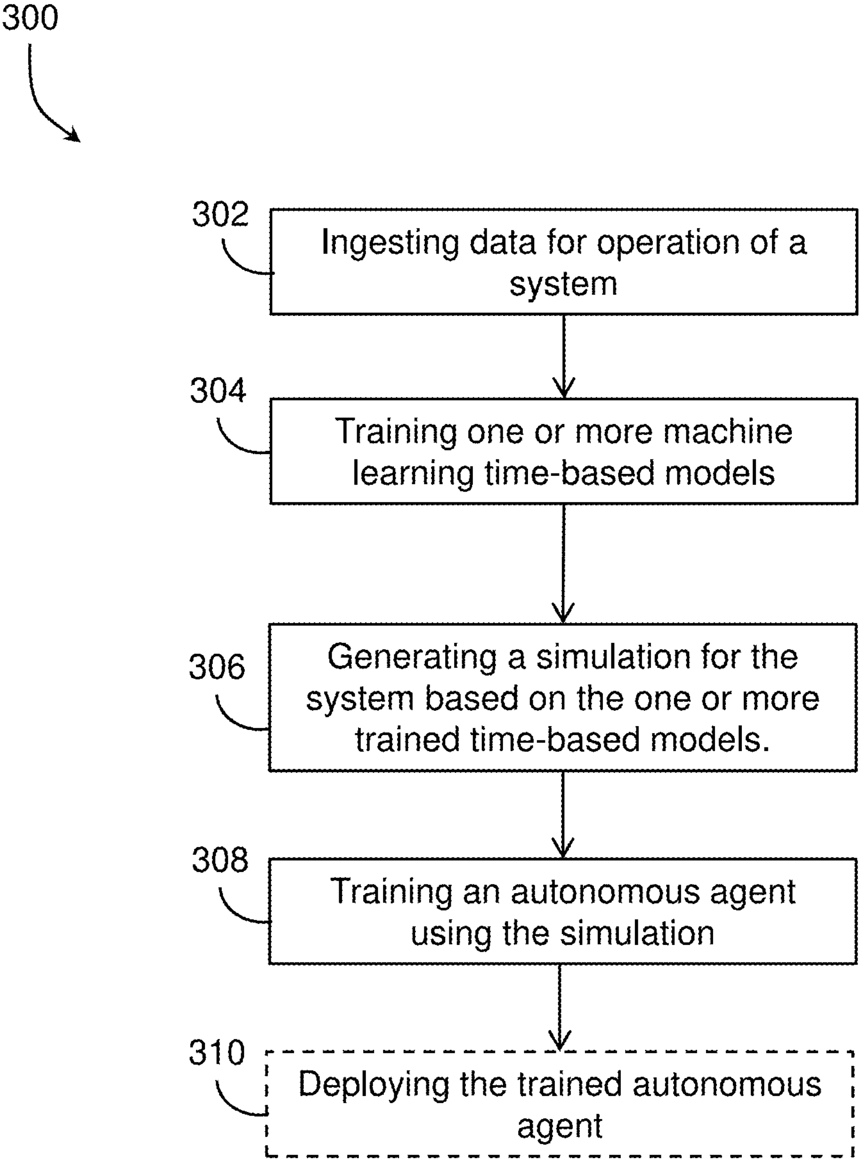
FIG. 3 is an example flowchart of a method for training an autonomous artificial intelligence (AI) agent using simulation models that consider a progression of time in decision-making processes in accordance with embodiments of the present invention.

FIG. 3 is a high-level flow diagram 300 of a methodology for training an autonomous artificial intelligence (AI) agent 102 using simulation models that account for temporal progression in decision-making processes. The method comprises ingesting data for the operation of a system 110 (step 302), training one or more machine learning time-based models (step 304), generating a simulation 108 for the system 100 based on the one or more trained time-based models (step 306), and training an autonomous AI agent 102 using the simulation 108 (step 308). In certain embodiments, once trained, the autonomous AI agent 102 can be deployed (step 310) in real-world systems to interface with the hardware or software of the system in real-time based on decisions informed by the temporal dynamics learned from the simulation. In such embodiments, the autonomous AI agent 102 applies learned temporal relationships derived from the trained time-based models to predict system behavior and optimize control actions.

In some embodiments, the functionality of ingesting data for the operation of a system (step 302) is performed by the data quality check module 202 as set forth in FIG. 2, with the functionality of training one or more machine learning time-based models (step 304) being performed by the machine learning model training module 204, the generating of a simulation 108 for the system 110 based on the one or more trained time-based models (step 306) being performed by the simulation generation module 206, and the training an autonomous AI agent 102 using the simulation 108 (step 308) being performed by the agent training module 208 of FIG. 2 respectively. One skilled in the art would understand that the functionality of the different steps and modules can be combined or omitted without deviating from the spirit of the invention.

Figure 4:
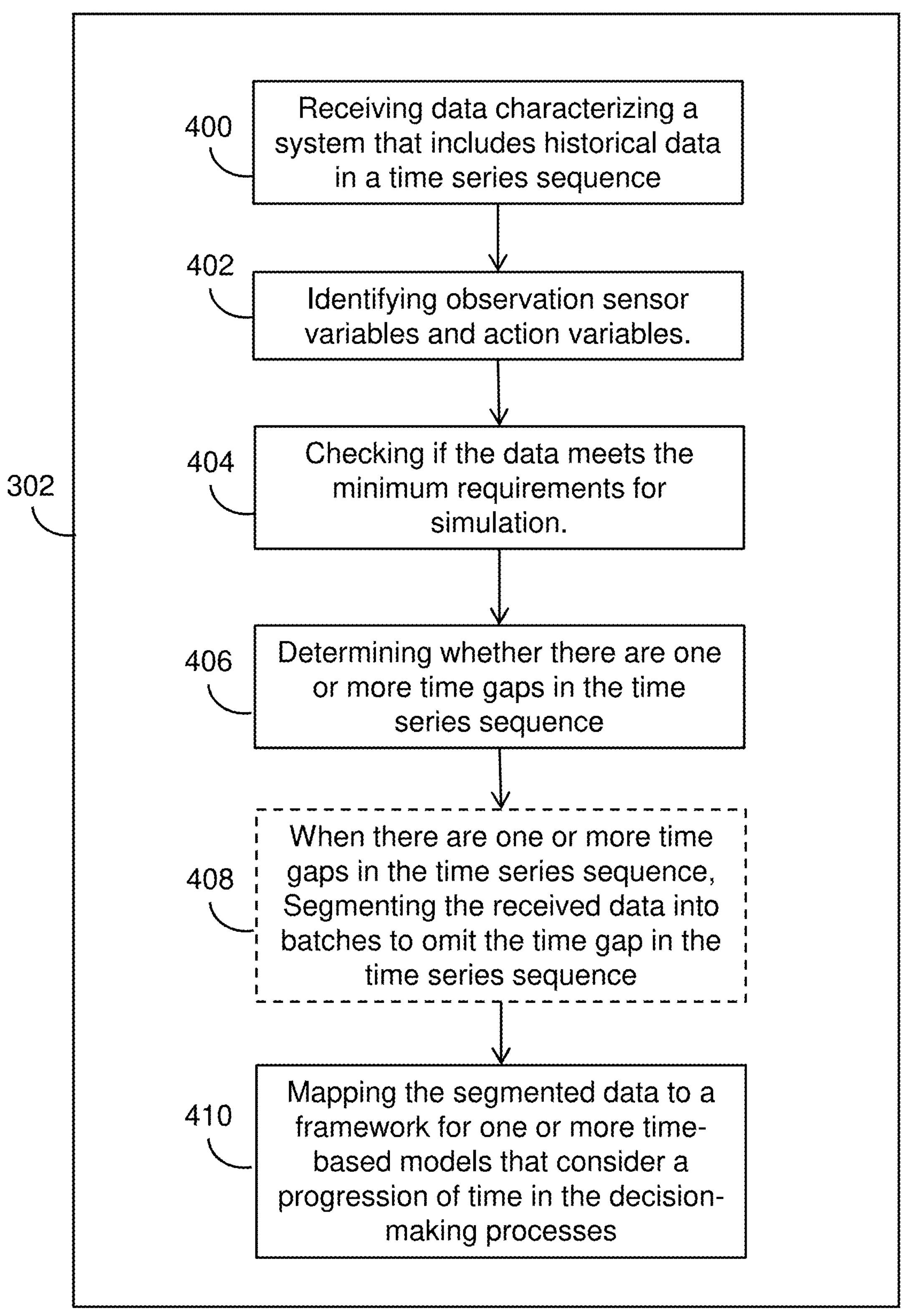
FIG. 4 is an example diagram identifying the additional steps involved in ingesting data for the operation of a system in accordance with embodiments of the present invention.

FIG. 4 depicts the processes involved in ingesting data for the operation of a system 110 (step 302) in accordance with an embodiment. Here, ingesting data for the operation of a system 110 comprises receiving data characterizing a system 110 that includes historical data in a time series sequence (step 400), identifying observation sensor variables and action variables (step 402), checking whether the data meets the minimum requirements for simulation (step 404), and determining whether there are one or more time gaps in the time series sequence that would disrupt the temporal continuity of the data (step 406). When there are one or more time gaps in the time series sequence, the received data is segmented into temporally continuous batches to preserve temporal relationships while omitting the time gap in the time series sequence (step 408). The segmented data is mapped to a framework for one or more time-based models that account for the progression of time in decision-making processes (step 410).

In certain embodiments, receiving data characterizing a system 110 that includes historical data in a time series sequence (step 400) comprises receiving data from a user. In some such embodiments, the data is collected (sampled) by sensors monitoring the system during the operation of the system 110 to be simulated and represent the system 110's behavior over time. This includes data logs recorded during the operation of the system 110. Other possible data will be apparent to one skilled in the art, given the benefit of this disclosure.

In certain embodiments, the historical data in the time series sequence comprises a minimum number of data points sufficient to capture the temporal dynamics of the system being modeled. The data may be sampled at a consistent time frequency, such as every second, every minute, or every hour, depending on the dynamics of the system. For example, in a manufacturing system where process variables change relatively slowly, data sampled at one-minute intervals may be sufficient, while in a system with faster dynamics, data sampled at one-second intervals may be used. The time series sequence may span a duration sufficient to capture representative operating conditions of the system, including normal operation, transient states, and responses to different control actions.

In certain embodiments, identifying observation sensor variables and action variables (step 402) comprises receiving an indication or identification of the sensor and action variables that are present in the received data from a user. In other embodiments, the system may be able to identify sensor and action variables based on the data composition or the type of system 110 being characterized by the data.

Figure 5:
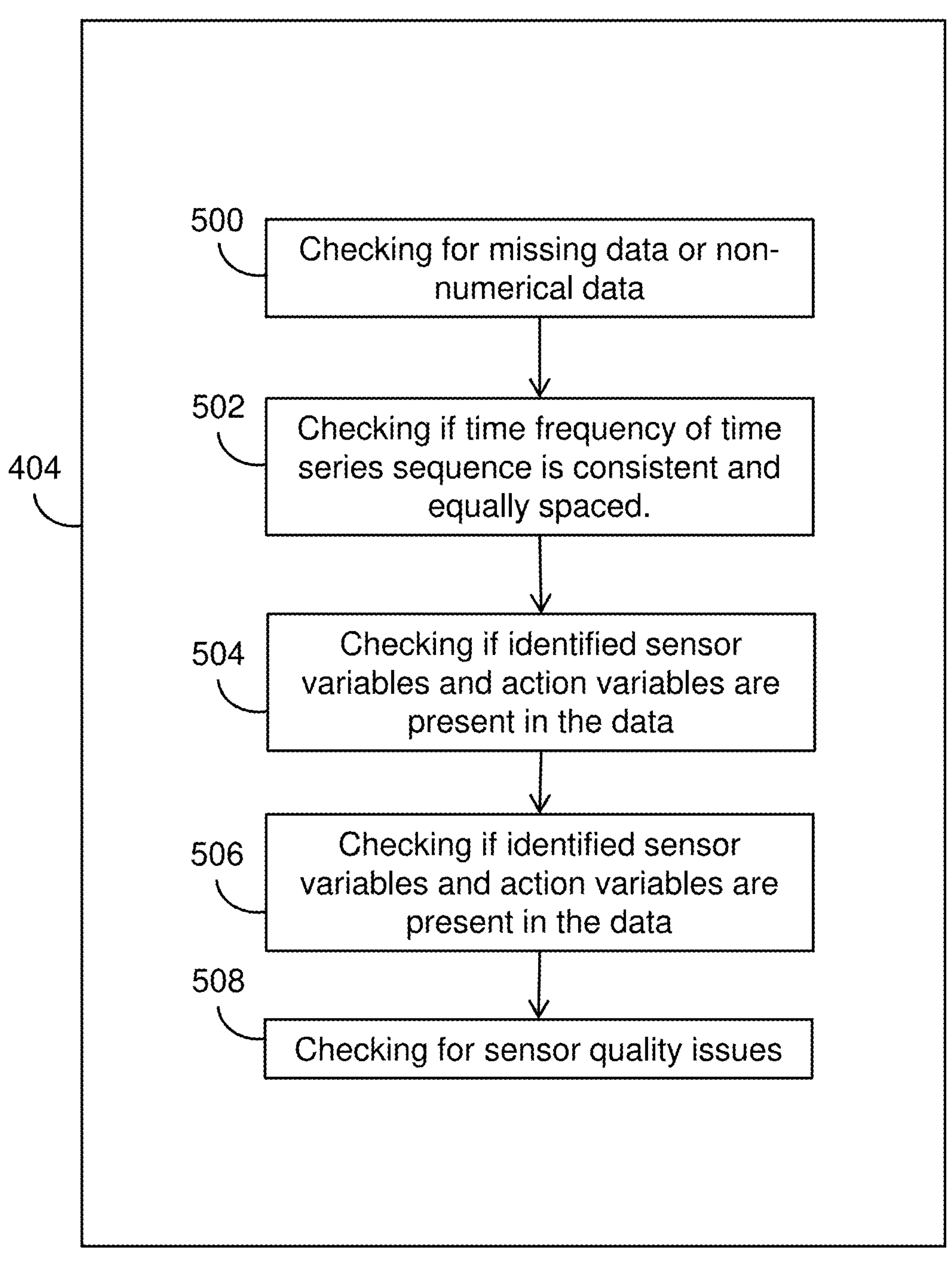
FIG. 5 is an example diagram identifying the additional steps involved in checking whether data meets the minimum requirements for simulation in accordance with embodiments of the present invention.

FIG. 5 depicts the processes involved in checking whether the data meets the minimum requirements for simulation (step 404) including verifying time frequency consistency and sensor data quality. Here, this involves checking for missing data or non-numeric data (step 500), checking whether the time frequency of the time series sequence is consistent and equally spaced (step 502), checking whether identified sensor variables and action variables are present in the data (step 504), checking whether sensor data is outside of defined constraints (step 506), and checking for sensor quality issues (step 508).

In certain embodiments, checking for missing data or non-numeric data (step 500) involves loading the data, converting each column of data to numeric data; checking for missing values, removing missing values while maintaining continuity and consistent time frequency of the time-series sequence, or replacing missing data with interpolated data. All non-numeric data will be treated as invalid and removed from the processed dataset.

In certain embodiments, checking whether the time frequency of the time series sequence is consistent and equally spaced (step 502) involves ordering the data time-series index and evaluating every step change to check whether the sequence is equally spaced and consistent.

In certain embodiments, checking whether identified sensor variables and action variables are present in the data (step 504) involves analyzing all sensor data and action variables provided by the user and checking whether they are present and with good quality in the data.

In certain embodiments, checking whether sensor data is outside of defined constraints (step 506) involves asking the user to provide constraints for sensor variables and checking whether the data complies with the constraints. Values outside of constraints are addressed.

In certain embodiments, checking for sensor quality issues (step 508) involves identifying sensor failures such as spiked, outliers, flatlines, or missing values.

Figure 6:
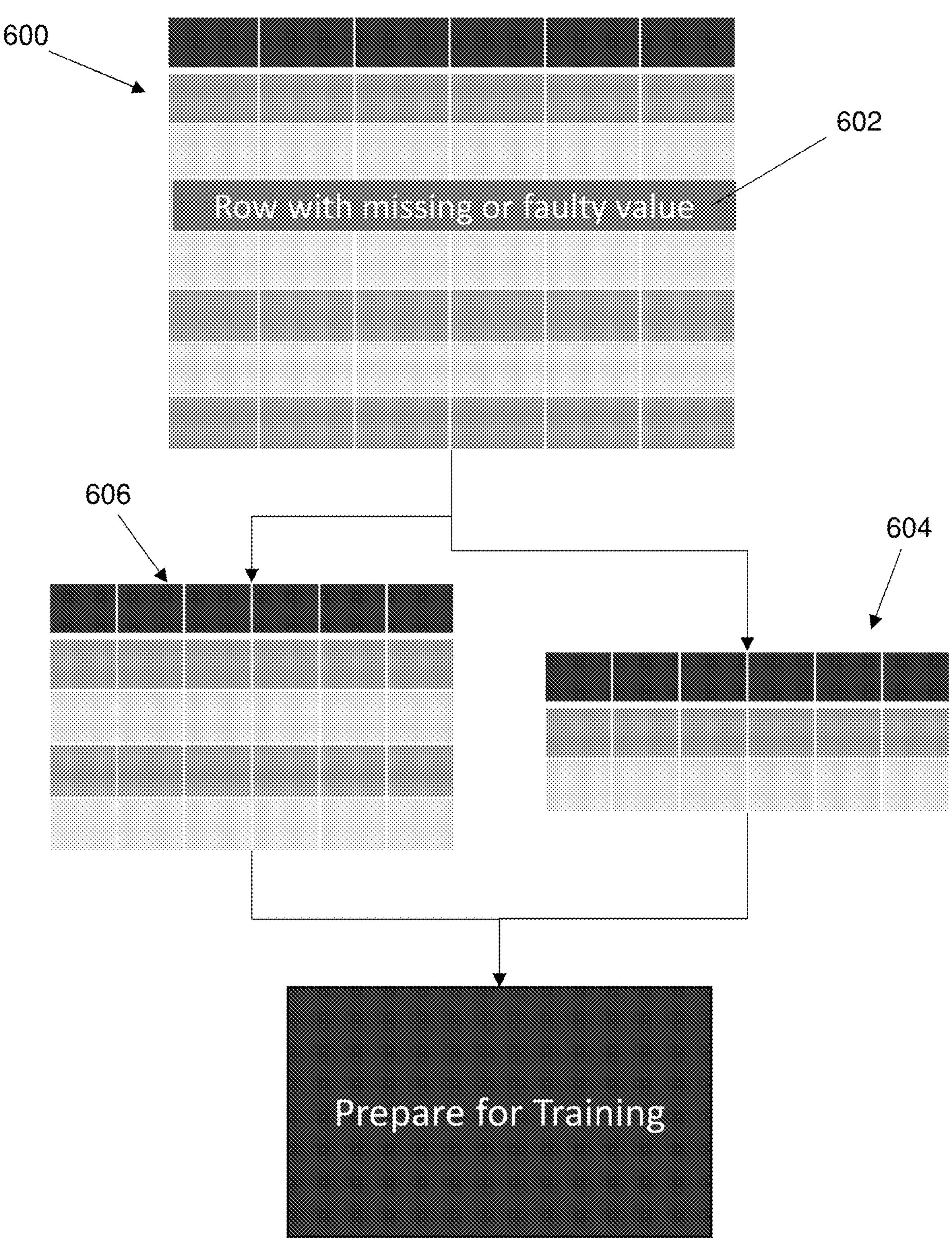
FIG. 6 is an illustration of the dataset shaping to consider time in the machine learning model in accordance with embodiments of the present invention.

FIG. 6 depicts the steps of determining whether there are one or more time gaps in the time series sequence that would disrupt the temporal continuity of the data (step 406) and, when there are one or more time gaps in the time series sequence, segmenting the received data into batches to omit the time gap in the time series sequence (step 408). Here, a historical data set 600 has been determined to include missing or faulty data 602 (step 406). These gaps comprise discontinuities or missing data points in the time series sequence. To account for this, the data 600 can be formatted or partitioned as multiple time segments or subsets 604 and 606 that omit the missing, irregular, irrelevant, or faulty portion of data 602 (step 408). These multiple time segments 604 and 606 can then be used to train a machine learning model. Segmenting the data into temporally continuous batches improves the accuracy of the trained time-based models by preventing the models from learning incorrect temporal relationships caused by discontinuities in the time series sequence Referring back to FIG. 4, in certain embodiments, mapping the segmented training data to the framework (step 410) comprises transforming the segmented data into a structured format compatible with the one or more models. In other embodiments, this involves aligning the segmented training data with a predefined input format for the one or more time-based models.

Figure 7:
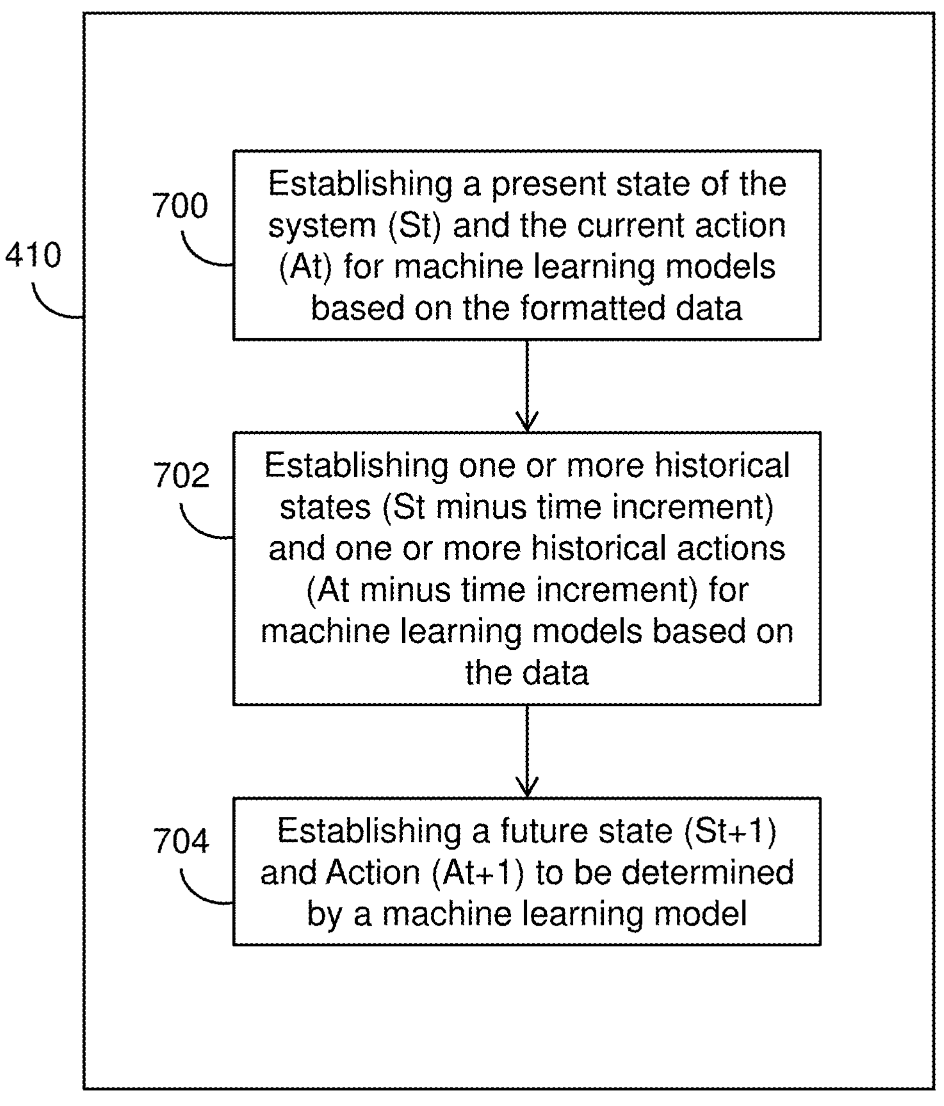
FIG. 7 is an example diagram identifying the additional steps involved in mapping segmented data to one or more time-based models in accordance with embodiments of the present invention.

FIG. 7 depicts the steps involved in mapping the segmented data to a framework for one or more time-based models that consider a progression of time in the decision-making processes (step 410) in accordance with an embodiment. Here the process of mapping involves establishing a present state of the system (St) and the current action (At) for machine learning models based on the formatted data (step 700), establishing one or more historical states (St minus time increment) and one or more historical actions (At minus time increment) for machine learning models based on the data (step 702), and establishing a future state (St+1) and Action (At+1) to be determined by a machine learning model (step 704). An example of this can be seen in FIG. 8.

Figure 8:
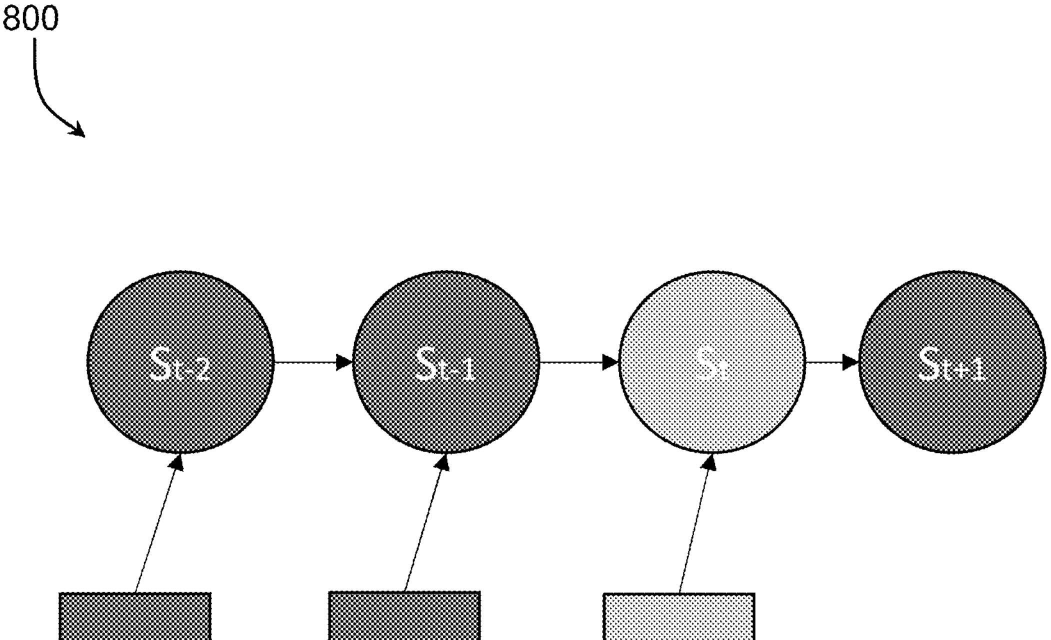
FIG. 8 depicts an example representation of a modeled system with its states and actions in accordance with the embodiments of the present invention.

In FIG. 8, system 800 is represented as a sequential series of states(S) and Actions (A). To account for time, in certain embodiments, the system is represented by a set of variables, and the present state ($S_t$), present action ($A_t$), the historical states ($S_t$ minus Time Increments), and historical actions ($A_t$ minus Time Increments) represent values of the variables at different time points.

This provides a structured approach to designing machine learning models, ensuring that each step is carefully considered and executed to create an effective and accurate model. For example, in the present case, the data will involve current and historical data (having a temporal component) and be organized in a consistent time frequency (dt). The model being used is a modification of the raw data to a Markov decision process (MDP) model where the states(S) and Actions (A) further include a time component such that the present state is delineated as "$S_t$" and the present action is delineated as "$A_t$", while past states are delineated as "$S_t$-time increment" and past states are delineated as "$A_t$–time increment". This is used to determine a future state, which is delineated at "$S_t$+time increment." The handling of the data, including present and historical states and actions, is discussed more below. Other models, approaches, and/or techniques will be apparent to one skilled in the art, given the benefit of this disclosure.

The temporal mapping approach depicted in FIG. 8 provides a technical improvement over conventional machine learning approaches that do not account for temporal progression. By structuring the data to include both current and historical states and actions, the machine learning models can learn how the system evolves over time and how past actions influence future states. This temporal awareness enables the trained models to make more accurate predictions and enables the autonomous AI agent trained on simulations generated from these models to make better decisions that account for the temporal dynamics of the system being controlled.

In certain embodiments, the one or more models incorporate temporal dynamics or sequential dependencies in decision-making algorithms. In some embodiments, the one or more time-based models comprise at least one of a recurrent neural network (RNN), an XGBoost Regressor, a long short-term memory (LSTM) network, a generalized linear model (GLM), or a gated recurrent unit (GRU) network. These, in turn, can be combined with other algorithms or physics/mathematical formulas.

Referring back to FIG. 3, after the data for the operation of the system 110 has been ingested (step 302), the one or more machine learning models can be trained on the data (step 304). An example of what this may involve can be seen in FIG. 9.

Figure 9:
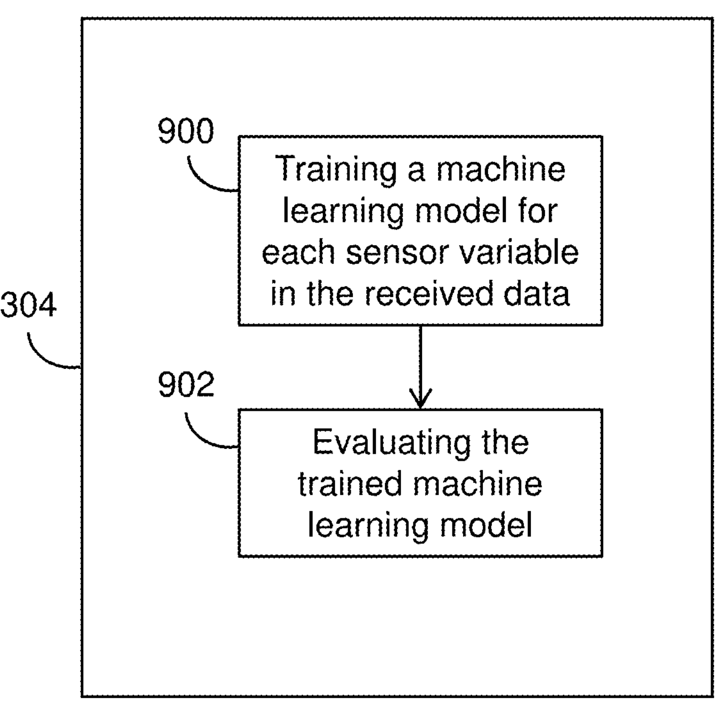
FIG. 9 is an example diagram identifying the additional steps involved in training one or more machine learning time-based models in accordance with embodiments of the present invention.

In the example of FIG. 9, training one or more machine learning models on the data comprises training a machine learning model for each sensor variable in the received data (step 900) and evaluating the trained machine learning model (Step 902).

In certain embodiments, selecting a machine learning model for each sensor variable involves evaluating the characteristics of the sensor variable data to determine which model type is most suitable. For example, sensor variables exhibiting strong sequential dependencies may be modeled using a long short-term memory (LSTM) network or a gated recurrent unit (GRU) network, while sensor variables with more complex nonlinear relationships may be modeled using an XGBoost Regressor. The selection may also consider factors such as the amount of available training data, the desired prediction accuracy, and computational constraints. Hyperparameters for each selected model, such as learning rate, number of layers, number of hidden units, or number of estimators, may be tuned using cross-validation or other optimization techniques known in the art.

In certain embodiments, training a machine learning model for each sensor variable in the received data (step 900) involves selecting a machine learning model for each sensor variable and training the selected machine learning model with the pre-processed data to predict the next value in time for the sensor variable in the discretized process dynamics.

Figure 10:
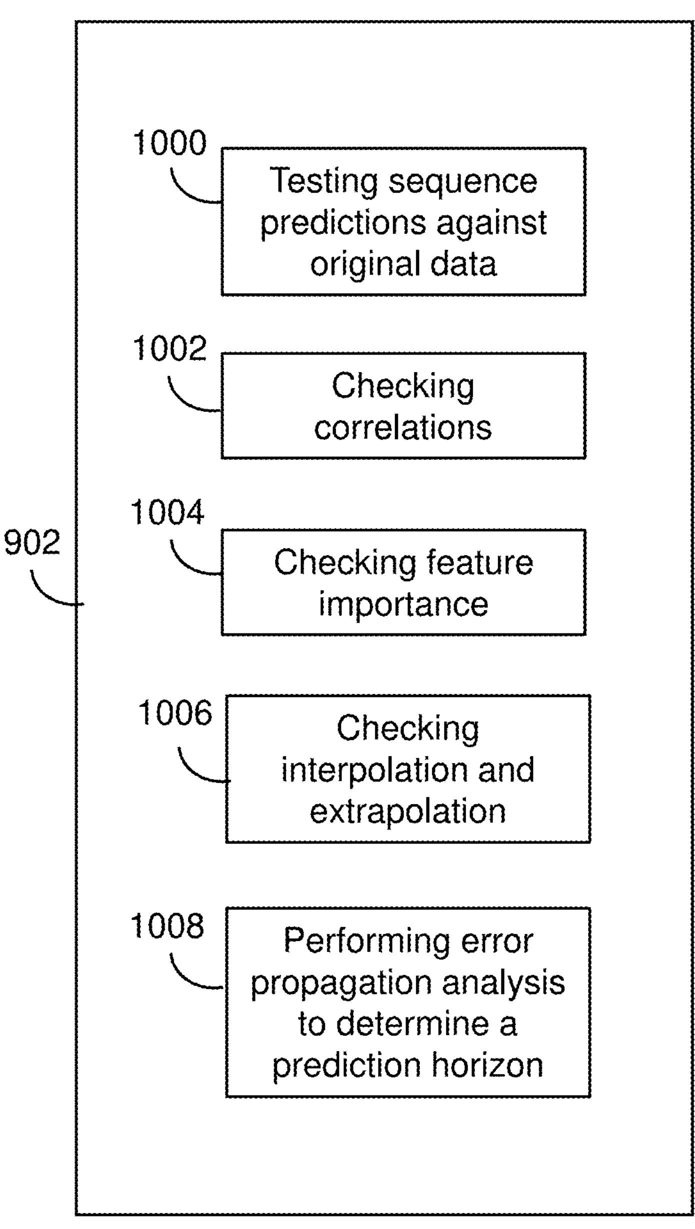
FIG. 10 is an example diagram identifying the additional processes involved in evaluating a trained machine learning time-based model in accordance with embodiments of the present invention.

FIG. 10 depicts processes performed in evaluating the trained machine learning model (Step 902) in accordance with embodiments. These include testing sequence predictions against the original data (block 1000), checking correlations (block 1002), checking feature importance (block 1004), checking interpolation and extrapolation (block 1006), and performing an error propagation analysis to determine the prediction horizon (block 1008).

In certain embodiments, testing sequence predictions against the original data (block 1000) involves running simulations within selected time ranges and mimicking the original dataset's actions to compare the simulation results with the dataset's original values and evaluate simulation accuracy.

In certain embodiments, checking correlations (block 1002) involves running tests to evaluate correlations between sensor variables and actions.

In certain embodiments, checking feature importance (block 1004) involves analyzing the importance of all sensor variables and ranking them for each sensor variable machine learning model, to improve the model training and provide insights to the user about data correlation for predictions.

In certain embodiments, checking interpolation and extrapolation (block 1006) involves analyzing predictions to prevent any inaccurate extrapolation, that is where the data used for predictions is out of bounds for the data used to train the machine learning models.

In certain embodiments, performing error propagation analysis to determine a prediction horizon (block 1008) involves running simulations over different time horizons to identify the optimal time horizon with the lowest error propagation when comparing simulation predictions to the real dataset.

Referring back to FIG. 3, after the one or more machine learning models have been trained on the data (step 304), a simulation 108 for the system 110 can be generated based on the one or more trained time-based models (step 306). In certain embodiments, this comprises creating a virtual environment that mimics the system 110's behavior using one or more trained models. An example of what this might involve can be seen in FIG. 11.

Figure 11:
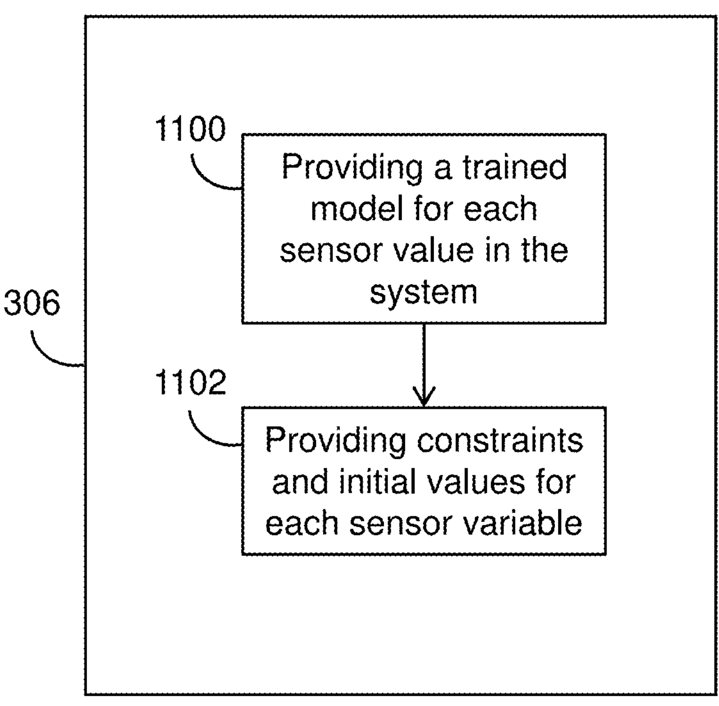
FIG. 11 is an example diagram identifying the additional steps involved in generating a simulation in accordance with embodiments of the present invention.

In the example of FIG. 11, generating a simulation 108 for the system 110 based on the one or more trained time-based models (step 306) involves providing a trained model for each sensor value in the system 110 (step 1100) and providing constraints and initial values for each sensor variable (step 1102).

In certain embodiments, providing a trained model for each sensor value in the system 110 (step 1100) involves training a machine learning model for each sensor variable provided by the user to predict their behavior based on actions.

In certain embodiments, providing constraints and initial values for each sensor variable (step 1102) involves having the user provide physical constraints for each sensor and action variable in the dataset, defining boundaries within which the simulation operates, and providing the point in the timeseries index to start the dataset.

In certain embodiments, generating the simulation involves combining the individual trained models for each sensor variable into a unified simulation framework. During each simulation time step, the simulation receives action inputs and uses the trained models to predict the next state of each sensor variable based on the current state, current actions, and historical states and actions. The predicted states from one time step become the inputs for the next time step, allowing the simulation to progress forward in time. Constraints provided for each sensor variable ensure that predicted values remain within physically realistic bounds. The simulation may be initialized using actual historical data from a selected starting point in the time series, providing realistic initial conditions for the simulation.

In certain embodiments, generating the simulation comprises creating a virtual environment that receives action inputs and produces state outputs that reflect how the system evolves over time based on the trained time-based models.

Referring back to FIG. 3, after the simulation 108 for the system 110 has been generated based on the one or more trained time-based models (step 306), the autonomous AI agent 102 can be trained using the simulation 108 (step 308). In certain embodiments, this comprises teaching the autonomous AI agent 102 to make decisions and take actions within the generated simulation 108. Examples of training types include reinforcement learning, classical controllers such as proportional-integral-derivative (PID), advanced controllers such as model predictive control (MPC), and other learning algorithms known in the art, or combinations thereof, using simulation as the environment.

Figure 12:
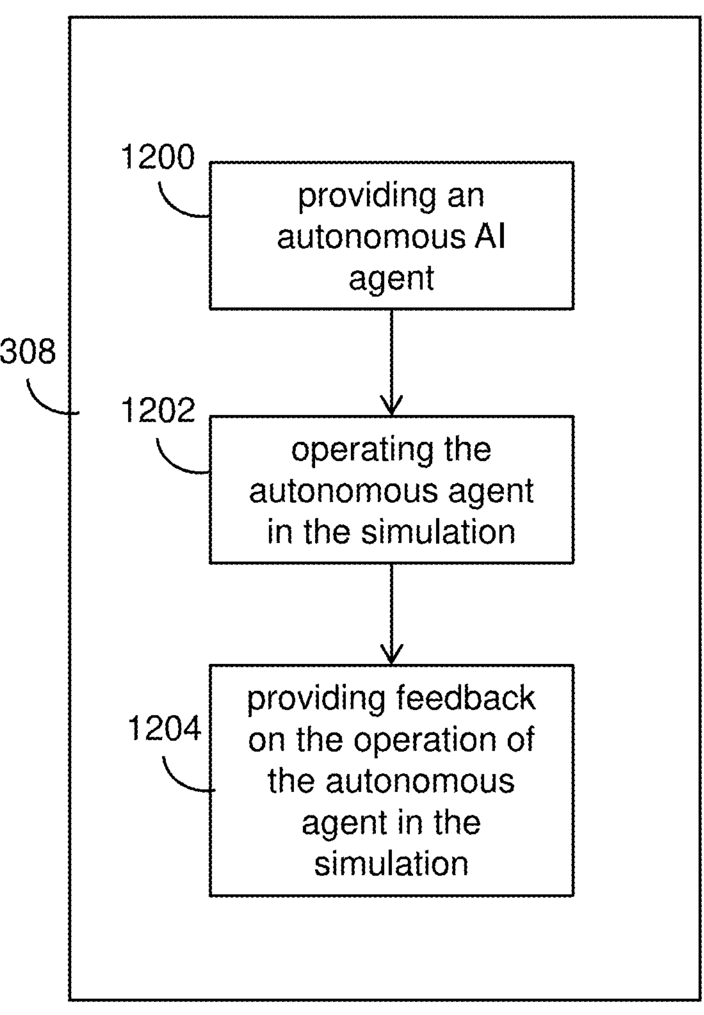
FIG. 12 is an example diagram identifying the additional steps involved in training an autonomous AI agent in accordance with embodiments of the present invention.

FIG. 12. depicts the steps involved in training an autonomous AI agent 102 using the simulation 108 (step 308) in accordance with an embodiment. Here, it involves providing an autonomous AI agent 102 (step 1200), operating the autonomous AI agent 102 in the simulation 108 (step 1202), and providing feedback on its operation in the simulation 108 (step 1204).

In certain embodiments, providing an autonomous AI agent 102 (step 1200) involves providing an autonomous AI agent 102 designed to interact with the system 110 being modeled in the simulation 108.

In certain embodiments, operating the autonomous AI agent in the simulation 108 (step 1202) involves running the simulation 108 and allowing the autonomous AI agent 102 to interact with it. In other embodiments, default values may be used based on the simulated system 110.

In certain embodiments, providing feedback on the autonomous AI agent 102's operation in the simulation 108 involves providing feedback directly to the agent 102 through its sensors. In other embodiments, a log or report may be generated based on the autonomous AI agent's behavior in the simulation 108.

Figure 13:
FIG. 13 is a diagrammatic illustration of a high-level architecture for implementing the platform in accordance with embodiments of the present invention.
Figure 13:
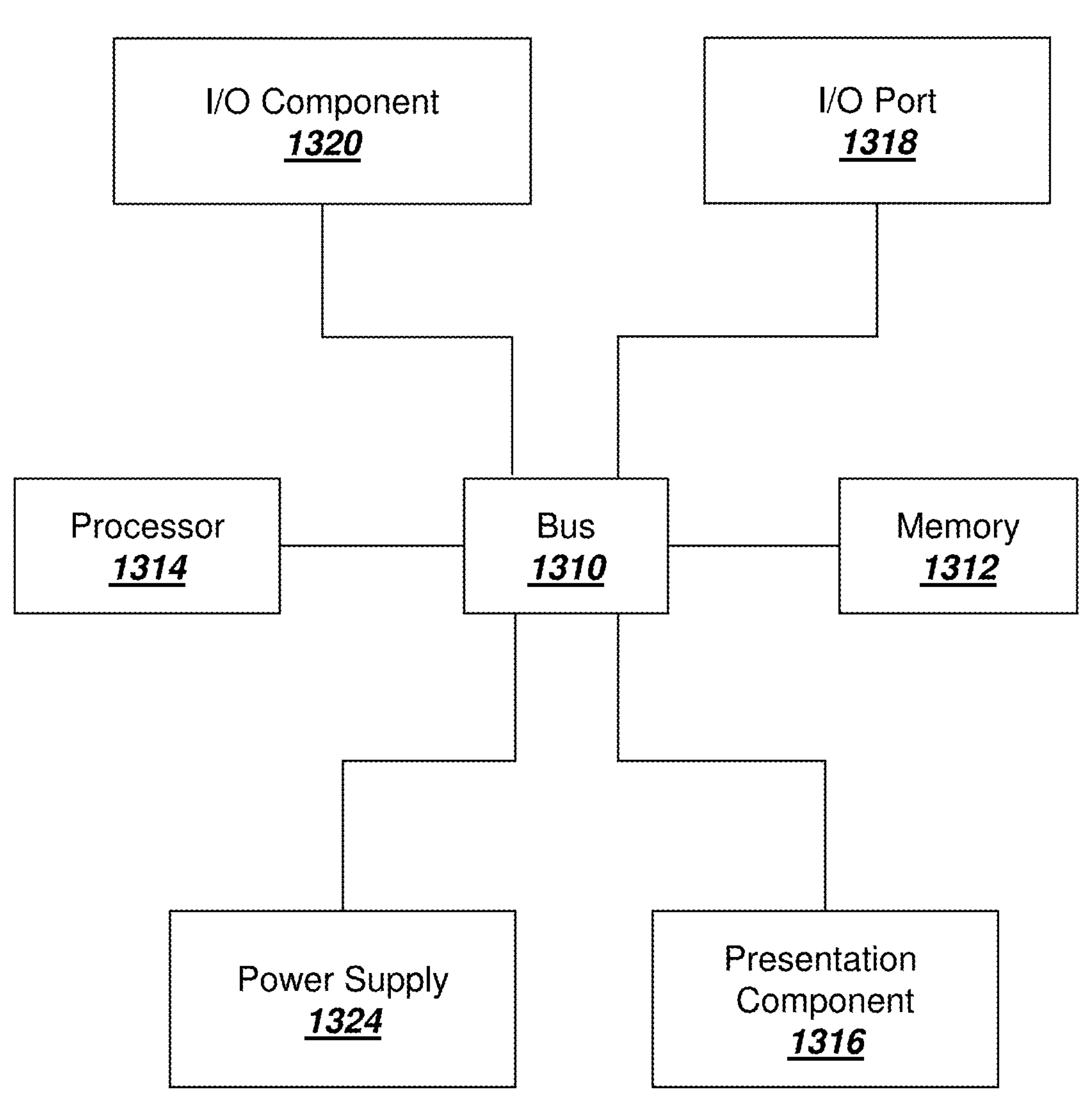

Any suitable and specifically configured electronic or computing device can be used to implement the functionality of the present invention described herein which may be provided as code in a non-transitory computer-readable medium. One illustrative example of such an electronic or computing device 1300 is depicted in FIG. 13. The computing device 1300 is merely an illustrative example of a suitable computing environment and in no way limits the scope of the present invention. A "computing device," as represented by FIG. 13, can include a "workstation," a "server," a "laptop," a "desktop," a "device," a "smart device," a "tablet," a "smartphone," an "ECR," or other specifically configured computing devices having sufficient computational processing resources to implement the invention, as would be understood by those of skill in the art. Given that the computing device 1300 is depicted for illustrative purposes, embodiments of the present invention may utilize any number of computing devices 1300 in any number of different ways to implement a single embodiment of the present invention. Accordingly, embodiments of the present invention are not limited to a single computing device 1300, as would be appreciated by one with skill in the art, nor are they limited to a single type of implementation or configuration of the example computing device 1300.

The computing device 1300 can include a bus or network 1310 that can be coupled to one or more of the following illustrative components, directly or indirectly: a memory 1312, one or more processors 1314, one or more presentation components 1316, input/output ports 1318, input/output components 1320, and a power supply 1324.

One of skill in the art will appreciate that the bus or network 1310 can include one or more buses, such as an address bus, a data bus, networks, or any combination thereof. One of skill in the art additionally will appreciate that, depending on the intended applications and uses of a particular embodiment, multiple of these components can be implemented by a single device. Similarly, in some instances, a single component can be implemented by multiple devices. As such, FIG. 13 is merely illustrative of an exemplary computing device that can be used to implement one or more embodiments of the present invention and in no way limits the invention.

The computing device 1300 can include or interact with a variety of computer-readable media. For example, computer-readable media can include Random Access Memory (RAM); Read Only Memory (ROM); Electronically Erasable Programmable Read Only Memory (EEPROM); flash memory or other memory technologies; CDROM, digital versatile disks (DVD), Solid State Drive (SSD), cloud, or other optical or holographic media; magnetic cassettes, magnetic tape, magnetic disk storage or other magnetic storage devices that can be used to encode information and can be accessed by the computing device 1300.

The memory 1312 can include computer-storage media in the form of volatile and/or nonvolatile memory for holding data. The memory 1312 may be removable, non-removable, or any combination thereof. Exemplary hardware devices are devices such as hard drives, solid-state memory, optical-disc drives, and the like. The memory stores instructions for execution by one or more processors 1314 that cause the one or more processors 1314 to perform the functionality set forth herein to design machine learning models. The computing device 1300 can include one or more processors 1314 that read data from components such as the memory 1312, the various I/O components 1320, etc. Presentation component(s) 1316 present data indications to a user or other device. Exemplary presentation components include a display device, speaker, printing component, vibrating component, etc.

The I/O ports 1318 can enable the computing device 1300 to be logically coupled to other devices, such as I/O components 1320, using serial, parallel, or network, and/or wireless communication protocols. Some of the I/O components 1320 can be built into the computing device 1300. Examples of such I/O components 1320 include a microphone, joystick, recording device, gamepad, satellite dish, scanner, printer, wireless device, networking device, and the like.

As utilized herein, the terms "comprises" and "comprising" are intended to be construed as being inclusive, not exclusive. As utilized herein, the terms "exemplary," "example," and "illustrative," are intended to mean "serving as an example, instance, or illustration" and should not be construed as indicating, or not indicating, a preferred or advantageous configuration relative to other configurations. As utilized herein, the terms "about," "generally," and "approximately" are intended to cover variations that may exist in the upper and lower limits of the ranges of subjective or objective values, such as variations in properties, parameters, sizes, and dimensions. In one non-limiting example, the terms "about", "generally", and "approximately" mean at, or plus 10 percent or less, or minus 10 percent or less. In one non-limiting example, the terms "about", "generally", and "approximately" mean sufficiently close to be deemed by one of skill in the art in the relevant field to be included. As utilized herein, the term "substantially" refers to the complete or nearly complete extent or degree of an action, characteristic, property, state, structure, item, or result, as would be appreciated by one of skill in the art. For example, an object that is "substantially" circular would mean that the object is either completely a circle to mathematically determinable limits, or nearly a circle as would be recognized or understood by one of skill in the art. In some instances, the exact allowable degree of deviation from absolute completeness may depend on the specific context. However, in general, the nearness of completion will be to have the same overall result as if absolute and total completion were achieved or obtained. The use of "substantially" is equally applicable when utilized in a negative connotation to refer to the complete or near complete lack of an action, characteristic, property, state, structure, item, or result, as would be appreciated by one of skill in the art.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. Within this specification, embodiments have been described in a way that enables a clear and concise specification to be written, but it is intended and will be appreciated that embodiments may be variously combined or separated without parting from the invention. It is intended that the present invention be limited only to the extent required by the appended claims and the applicable rules of law.

It is also to be understood that the following claims are to cover all generic and specific features of the invention described herein and all statements of the scope of the invention which, as a matter of language, might be said to fall therebetween.

What is claimed is:

1. A method for training an autonomous artificial intelligence (AI) agent using simulation models that consider a progression of time in decision-making processes, the method comprising:

ingesting data for operation of a system, the ingesting comprising:

receiving, via one or more processors, data characterizing a system that includes historical data in a time series sequence collected by sensors monitoring the system;

identifying, by the one or more processors, observation sensor variables and action variables from the received data;

checking, by the one or more processors, whether the data meets minimum requirements for simulation, including verifying time frequency consistency and sensor data quality;

determining, by the one or more processors, whether there are one or more time gaps in the time series sequence that would disrupt temporal continuity of the data;

when there are one or more time gaps in the time series sequence, segmenting, by the one or more processors, the received data into temporally continuous batches to preserve temporal relationships while omitting the time gaps in the time series sequence; and mapping, by the one or more processors, the segmented data to a framework for one or more machine learning time-based models that consider a progression of time in the decision-making processes;

training, by the one or more processors, the one or more machine learning time-based models using the mapped data to generate trained models that predict future system states based on current and historical states and actions;

generating, by the one or more processors, a simulation for the system based on the one or more trained time-based models, wherein the one or more trained time-based models are discretized and shaped to a decision-making process to create a virtual environment that mimics temporal behavior of the system;

training the autonomous AI agent using the simulation, wherein the trained autonomous AI agent learns to make decisions that account for temporal dynamics of the system; and deploying the trained autonomous AI agent to interface with the system in real-time, wherein the trained autonomous AI agent controls hardware or software of the system based on decisions informed by the temporal dynamics learned from the simulation.

2. The method of claim 1, wherein checking whether the data meets minimum requirements for simulation comprises:

checking for missing data or non-numeric data;

checking whether time frequency of time series sequence is consistent and equally spaced;

checking whether identified sensor variables and action variables are present in the data;

checking whether sensor data is outside of defined constraints; and checking for sensor quality issues.

3. The method of claim 1, wherein mapping the data to a framework for one or more models that consider a progression of time in decision-making processes comprises:

establishing a present state of the system ($S_t$) and a current action ($A_t$) for machine learning models based on the data;

establishing one or more historical states ($S_t$ minus time increment) and one or more historical actions ($A_t$ minus time increment) for machine learning models based on the data; and establishing a future state ($S_t$+1) and Action ($A_t$+1) to be determined by a machine learning model.

4. The method of claim 1, wherein the one or more machine learning time-based models comprise a Markov decision process (MDP) in a discretized simulation.

5. The method of claim 1, wherein training one or more machine learning time-based models comprises:

training a machine learning model for each sensor variable in the received data; and evaluating the trained machine learning model by:

testing sequence predictions against original data;

checking correlations;

checking feature importance;

checking interpolation and extrapolation; and performing error propagation analysis to determine a prediction horizon.

6. The method of claim 5, wherein evaluating the trained machine learning model further comprises:

performing error propagation analysis over different time horizons to identify an optimal time horizon with a lowest error propagation when comparing simulation predictions to the received data.

7. The method of claim 1, wherein generating a simulation for the system from the one or more trained models comprises:

providing a trained model for each sensor value in the system; and providing constraints and initial values for each sensor variable.

8. The method of claim 1, wherein training the autonomous AI agent using the simulation comprises:

providing the autonomous AI agent;

operating the autonomous AI agent in the simulation; and providing feedback on the operation of the autonomous AI agent in the simulation.

9. The method of claim 1, wherein the one or more time-based models comprise at least one of a recurrent neural network (RNN), an XGBoost Regressor, a long short-term memory (LSTM) network, a generalized linear model (GLM), or a gated recurrent unit (GRU) network.

10. The method of claim 1, wherein mapping the segmented data to the framework comprises aligning the segmented training data with a predefined input format for the one or more time-based models.

11. The method of claim 1, wherein training the autonomous AI agent comprises utilizing one or more of reinforcement learning, proportional-integral-derivative (PID) controllers, model predictive control (MPC) controllers, or a combination of thereof, using the simulation as an environment.

12. The method of claim 1, wherein segmenting the received data into temporally continuous batches improves accuracy of the trained time-based models by preventing the models from learning incorrect temporal relationships caused by discontinuities in the time series sequence.

13. The method of claim 1, wherein mapping the segmented training data to the framework comprises structuring the segmented data such that each data point includes present states, present actions, historical states, and historical actions across multiple time increments, thereby preserving temporal dependencies between states and actions for the trained models.

14. The method of claim 1, wherein the trained autonomous AI agent interfaces with a real-world system to control hardware or software based on decisions informed by the temporal dynamics learned from the simulation.

15. The method of claim 1, further comprising:

deploying the trained autonomous AI agent to control the system in real-time, wherein the autonomous AI agent applies learned temporal relationships to predict system behavior and optimize control actions.

16. The method of claim 1, wherein the system comprises at least one of a manufacturing system, an engineering system, or a logistics system, and wherein the trained autonomous AI agent controls operation of the system based on predictions of future system states derived from the trained time-based models.

17. The method of claim 1, wherein generating the simulation comprises creating a virtual environment that receives action inputs and produces state outputs that reflect how the system evolves over time based on the trained time-based models.

18. The method of claim 1, wherein the one or more time-based models comprise at least one of a recurrent neural network (RNN), an XGBoost Regressor, a long short-term memory (LSTM) network, a generalized linear model (GLM), or a gated recurrent unit (GRU) network.

19. The method of claim 1, wherein mapping the segmented data to the framework comprises aligning the segmented training data with a predefined input format for the one or more time-based models.

20. The method of claim 1, wherein training the autonomous AI agent comprises utilizing one or more of reinforcement learning, proportional-integral-derivative (PID) controllers, model predictive control (MPC) controllers, or a combination thereof, using the simulation as an environment.

21. A training system for training an autonomous artificial intelligence (AI) agent using models that consider a progression of time in decision-making processes, the training system comprising:

one or more processors;

a data quality check module configured executed by the one or more processors to:

receive data characterizing a system that includes historical data in a time series sequence collected from sensors monitoring the system;

identify observation sensor variables and action variables from the received data;

check whether the data meets minimum requirements for simulation;

determine whether there are one or more time gaps in the time series sequence;

when there are one or more time gaps in the time series sequence, segment the received data into temporally continuous batches to preserve temporal relationships while omitting the one or more time gaps in the time series sequence; and map the segmented data to a framework for one or more machine learning time-based models that consider a progression of time in decision-making processes;

a machine learning model training module configured executed by the one or more processors to:

train a machine learning model for each sensor variable in the data to predict future values based on current and historical states and actions; and evaluate the trained machine learning model;

a simulation generation module configured executed by the one or more processors to:

provide a trained model for each sensor value in the system; and provide constraints and initial values for each trained model to generate a simulation that mimics temporal behavior of the system; and an agent training module configured executed by the one or more processors to train the autonomous AI agent using the simulation to learn decisions that account for temporal dynamics of the system and deploy the trained autonomous AI agent to interface with the system in real-time, wherein the trained autonomous AI agent controls hardware or software of the system based on decisions informed by the temporal dynamics learned from the simulation.

22. The system of claim 21, wherein checking whether the data meets minimum requirements for simulation comprises:

checking for missing data or non-numeric data;

checking whether time frequency of time series sequence is consistent and equally spaced;

checking whether identified observation sensor variables and action variables are present in the data;

checking whether sensor data is outside of defined constraints; and checking for sensor quality issues.

23. The system of claim 21, wherein the agent training module is further configured executed by the one or more processors to:

operate the autonomous AI agent in the simulation; and provide feedback on operation of the autonomous AI agent in the simulation.

24. The system of claim 21, wherein the simulation generation module is further configured executed by the one or more processors to provide physical constraints for each sensor and action variable in the data, defining boundaries within which the simulation operates.

25. A non-transitory computer-readable medium storing instructions that, when executed by one or more processors, cause the one or more processors to perform operations comprising:

receiving data characterizing a system that includes historical data in a time series sequence collected from sensors monitoring the system;

identifying observation sensor variables and action variables from the received data; checking whether the data meets minimum requirements for simulation;

determining whether there are one or more time gaps in the time series sequence; when there are one or more time gaps in the time series sequence, segmenting the received data into temporally continuous batches to preserve temporal relationships while omitting the time gaps in the time series sequence;

mapping the segmented data to a framework for one or more machine learning time-based models that consider a progression of time in decision-making processes;

training the one or more machine learning time-based models using the mapped data to generate trained models that predict future system states based on current and historical states and actions;

generating a simulation for the system based on the one or more trained time-based models to create a virtual environment that mimics temporal behavior of the system;

training an autonomous artificial intelligence (AI) agent using the simulation, wherein the trained autonomous AI agent learns to make decisions that account for temporal dynamics of the system; and deploying the trained autonomous AI agent to interface with the system in real-time, wherein the trained autonomous AI agent controls hardware or software of the system based on decisions informed by the temporal dynamics learned from the simulation.

26. The non-transitory computer-readable medium of claim 25, wherein the operations further comprise:

training a machine learning model for each sensor variable in the received data; and evaluating each trained machine learning model by testing sequence predictions against original data and checking correlations between sensor variables and actions.

* * * * *